United States Patent [19]
Nirschl

[11] 3,987,319
[45] Oct. 19, 1976

[54] RADIATION-ACTIVATED SENSOR

[75] Inventor: Joseph C. Nirschl, West Long Branch, N.J.

[73] Assignee: The United States of America as represented by the Secretary of the Army, Washington, D.C.

[22] Filed: Dec. 5, 1974

[21] Appl. No.: 529,874

[52] U.S. Cl. .............................. 307/311; 307/251; 328/6; 340/237 S
[51] Int. Cl.² .................... G01T 1/18; H03K 17/60; H03K 3/42
[58] Field of Search .................. 307/311, 251, 304; 328/6; 340/237 S, 228 R; 250/385

[56] References Cited
UNITED STATES PATENTS

| | | | |
|---|---|---|---|
| 3,378,820 | 4/1968 | Alafi et al. ...................... | 340/228 R |
| 3,594,751 | 7/1971 | Ogden ............................. | 340/228 R |
| 3,603,949 | 9/1971 | Walthard ......................... | 340/237 S |
| 3,665,441 | 5/1972 | Suchomel et al. ............... | 340/237 S |
| 3,673,586 | 6/1972 | Blackwell ........................ | 340/237 S |

Primary Examiner—Stanley D. Miller, Jr.
Assistant Examiner—B. P. Davies
Attorney, Agent, or Firm—Nathan Edelberg; Jeremiah G. Murray; Arthur Boatright

[57] ABSTRACT

A sensing system for use in a remote location which detects electromagnetic radiation energy, the system being self-activating, turning itself automatically on and off, as a function of radiation intensity across the detector. In essence, when no radiation is present across the detector, the system will consume no power, the switches and MOSFET discriminator being essentially in an "off" position. Radiation across the detector provides a current to an input capacitance which when charged turns on the switch and the MOSFET discriminator. A switch driver produces an output pulse showing the presence of radiation; the system then shuts off awaiting the next radiation input. Since the sensor system uses virtually no power unless radiation is present, it is ideally suited for use in remote environments where battery power and size is a predominant consideration.

2 Claims, 3 Drawing Figures

RADIATION-ACTIVATED SENSOR

The invention described herein may be manufactured and used by or for the Government for governmental purposes without the payment of any royalties thereon or therefor.

BACKGROUND OF THE INVENTION

This invention relates generally to a device for detecting radiation and specifically to a radiation activated sensor to be utilized in a remote location, the device being characterized by having minimal power consumption for operation.

Systems for detecting radiation are well known in the prior art. However, oftentimes if the device is to be utilized in a remote location, battery size and power consumption may be a predominant consideration, such that some trade off of performance requirements with regard to accuracy and response linearity may be made. The instant invention utilizes a recycling discharge scheme in conjunction with an ion chamber which differs from earlier recycling ion chamber techniques, such as the neon glow lamp discharge, primarily by its compatability with a much lower and single operating battery voltage for both ion chamber and circuitry, thus obviating the need for a DC converter or voltage step-up. This feature, when utilized in conjunction with a small ion chamber, provides a compact sensor package to monitor radiation in the intensity range of from 1 to 1,000 Rad/h of ionizing (gamma or X-ray) radiation at remote locations. The circuitry also provides that in the absence of ionizing radiation, the sensor system power consumption is virtually zero due to a metal-oxide semiconductor (MOS) device. The scheme may also prove useful for low power radiation detection in the visible and other portions of the electro-magnetic radiation frequency spectrum.

BRIEF DESCRIPTION OF THE INVENTION

A radiation activated sensor utilizing a MOSFET (metal-oxide semiconductor field effect transistor) discriminator coupled to a current source and a capacitor, the circuit including a switch driver connected to the discriminator, and a high impedance switch. The circuit provides a pulse output from the switch driver. The MOSFET discriminator is normally in an "off" position until the capacitor is charged through a threshold voltage which momentarily turns the MOSFET discriminator to an "on" position. Activation of the MOSFET discriminator then actuates and turns on a switch driver which closes a high impedance switch momentarily, thus discharging the retained threshold charge on the capacitor. After the capacitor is discharged, the system is returned to its previous condition with the MOSFET discriminator and the switch driver being in the off position. In one embodiment, the MOSFET discriminator is utilized as a key circuit element for a recycling ion chamber discharge system, the power demand of which varies with the signal radiation level. The system power supply may be from a 12 Volt battery. The instant invention, as disclosed, may be accomplished with at least two different embodiments, one in which a magnetic reed-relay is utilized as a high impedance switch, while in the other one the reed-relay is replaced with solid state circuit elements.

In operation, a radiation detecting means, such as a miniature ion chamber is coupled across and to the charging capacitor. Any radiation will thus produce a current flow to the capacitor resulting in the charging of it. The MOSFET discriminator, which acts as a high level detector, is connected on one side to the capacitor, such that when a threshold voltage is achieved on the capacitor, the discriminator will be switched to an on position. With the discriminator in the on position, current will then flow through the switch driver which activates momentarily either a magnetic reed relay or a pair of solid state circuit elements, discharging the capacitor, thus returning the entire circuit to its previously off condition. At the same time, a pulse is received at the output from the switch driver, thus providing an indication of the presence of radiation, the pulse rate being directly proportional to the incidence of radiation. In the off condition (when no radiation or insufficient radiation to produce a threshold discriminator voltage), the circuit will be passive and will not (ideally) consume any power. There will, in actuality, be a small leakage current which is minimal.

Although the device in the embodiments disclosed are for gamma and X-ray radiation detection and utilize an ion chamber, the device may find other applications in the detection of electromagnetic energy throughout the spectrum range and thus should not be limited to the specific embodiments taught.

It is an object of this invention to provide a radiation activated sensor which is passive in nature and which consumes little or no power when radiation is not present across the detector.

It is another object of this invention to provide a radiation sensing device for use in a remote location which is suited to be used when battery power is at a premium.

But still yet another object of this invention is to provide an electromagnetic radiation sensing device which in the absence of radiation, has virtually zero power consumption.

In accordance with these and other objects which will be apparent hereinafter, the instant invention will now be described with particular reference to the accompanying drawings.

PREFERRED EMBODIMENT OF THE INVENTION

Figure 1:
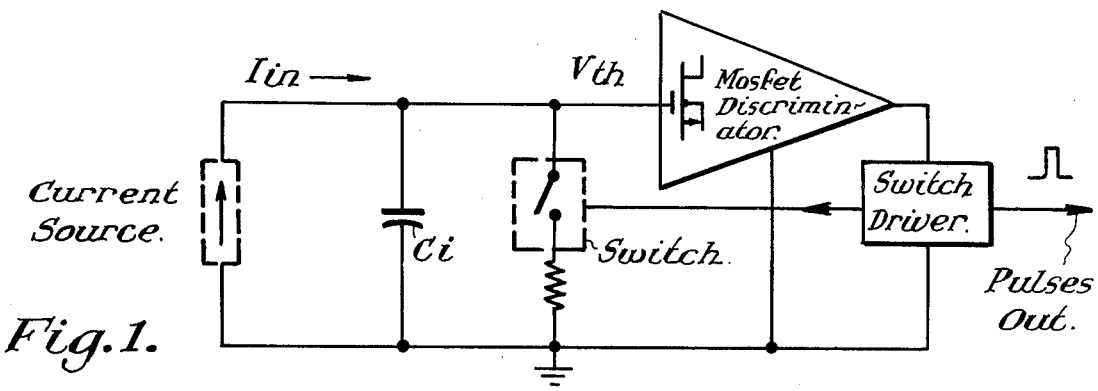
FIG. 1 shows a schematic circuit diagram showing the basic principles involved in the operation of the instant invention.

Referring now to the drawings, and in particular to FIG. 1, the basic principle of operation of the instant invention is shown. The current source represents any detecting chamber in which electromagnetic radiation can produce a current $I_{in}$ as shown. A capacitor $C_i$ is connected across the current source and is utilized to store a charge representative of the current created from the radiation detector. Connected on one side to the capacitor is a MOSFET discriminator having a threshold "turn-on" voltage of $V_{th}$. A switch driver is connected to the discriminator and to the central switch which represents a high impedance switch. Whenever threshold voltage $V_{th}$ is achieved on capacitor $Ci$, the MOSFET discriminator will then be switched from an off position to an on position which in turn actuates the switch driver to the on position causing the main central switch to close momentarily, thereby allowing the capacitor $Ci$ to discharge through the switch to ground, returning the entire circuit back to the off position. When the switch driver is actuated, a pulse is discharged at the output. Thus when little or no current is present from the current source (which reprsents the radiation detector), the entire circuit is in a passive mode with the MOSFET discriminator and the switch driver being in an off position and the main switch being open such that no power is consumed by the circuit. The momentary switching on of the MOSFET discriminator and switch driver closes the switch only after capacitor $Ci$ has achieved sufficient threshold voltage to turn the discriminator on. When the input voltage $Vi$ (resulting from the current source) reaches the threshold voltage $Vth$ of the MOSFET discriminator, the discriminator becomes conductive causing the switch driver to change state from a normal off position to a temporary on position, thereby activating, by way of the switch driver, the high impedance switch which may be either a reed-relay or solid state device. In the absence of radiation, $Iin$ reduces to a very low level leakage current so that the pulse rate genrated is very small (typically one pulse every 5 minutes).

The detector represented in FIG. 1 by the current source which is utilized for gamma and energetic X-rays may be a miniature ionization chamber that is readily adapted to the sensing circuitry. High impedance components can be accomodated in the center well of the chamber with a short lead connection to the charge-collecting electrode. One desirable feature of the ion chamber is the relatively low polarization voltage (approximately 12 Volts) that will provide adequate collecion efficiency and response linearity. Thus, the ion chamber selected is compatible with the battery voltage of the MOSFET and discriminator circuit. The system power is supplied from a 12 volt battery.

REED-RELAY CIRCUIT

Figure 2:
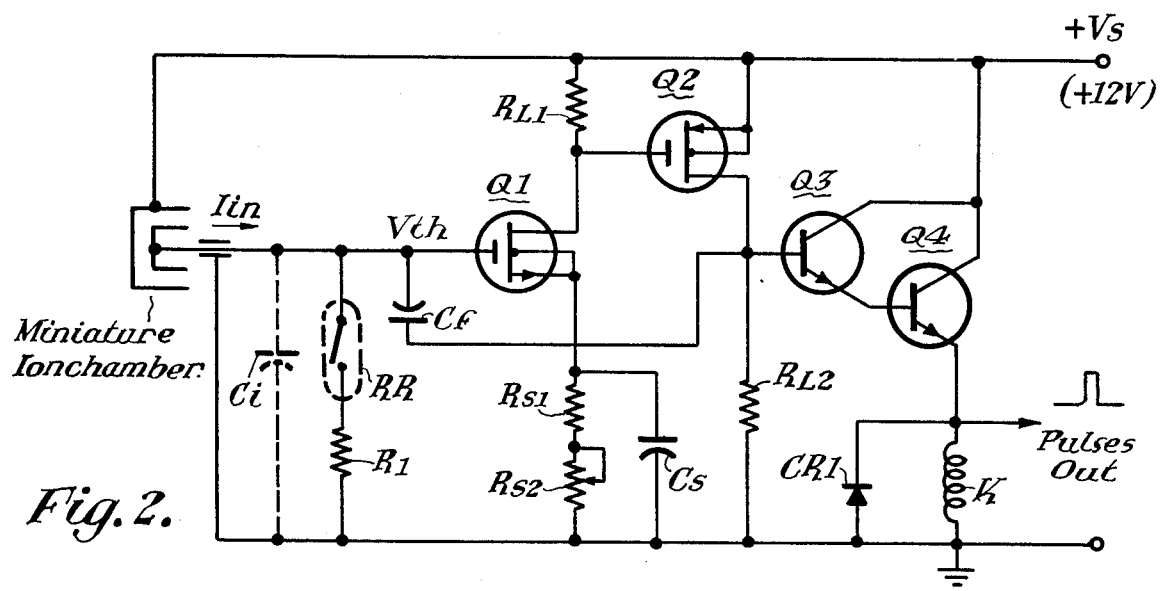
FIG. 2 shows a schematic circuit diagram of the instant invention which utilizes a magnetic reed-relay as a high impedance switch for discharging a capacitor.

In this embodiment, shown in FIG. 2, the high impedance switch in FIG. 1 is achieved utilizing a magnetic reed-relay. As shown in FIG. 2, Q1 and Q2 represent a pair of MOSFET'S which act as the MOSFET discriminator. The switch driver is accomplished with a pair of transistors Q3 and Q4, (the operation is discussed below). A magnetic reed-relay coil K, shown connected to the emitter of Q4, controls reed contacts RR. The voltage source is a 12 Volt battery represented as $Vs$.

In operation electromagnetic radiation received in the miniature ion chamber will cause a current $Iin$ to flow and a voltage $Vi$ to develop across capacitor $Ci$. When the input voltage $Vi$ approaches the gate threshold voltage of the first MOSFET Q1, the drain-to-source channel begins to conduct with the amount of conduction dependent upon the circuit constants and the device transconductance or gain factor As $Vi$ continues to rise, the drain current, ID, of Q1 increases until the threshold voltage of MOSFET Q2 is achieved which constitutes the MOSFET discriminator threshold voltage. At the MOSFET threshold voltage a regenerative action takes place due to positive feedback between the drain Q2 and the gate of Q1 by a capacitor $Cf$ and sufficient loop gain causing a relatively rapid turn-on of Q1 and Q2. This turn-on of Q1 and Q2 actuates and turns on Q3 and Q4 resulting in the energizing of the relay K. When the contact of the reed-relay RR is thus momentarily or temporarily closed, the capacitance $Ci$ will be discharged, returning the system to its initial state of off. The relay is a miniature magnetic reed-relay with a glass insulation resistance of $10^{14}$ ohms and exhibits relatively fast response. Each time the Q3–Q4 switch driver is actuated, a pulse output will be achieved which is indicative of presence of radiation.

SOLID-STATE SWITCH CIRCUIT

Figure 3:
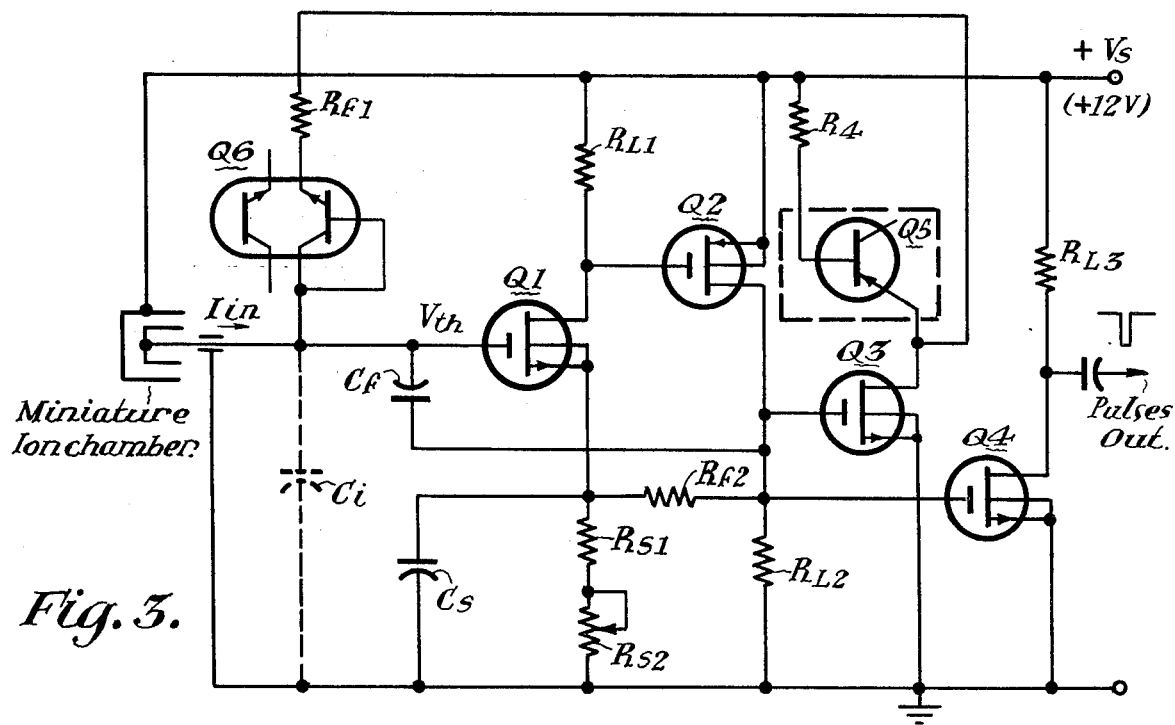
FIG. 3 shows a schematic circuit diagram which represents an alternate embodiment of the instant invention utilizing solid state circuitry for the discharging of the system input capacitance.

As an alternate embodiment of the invention, the reed-relay switch of FIG. 2 is replaced with solid-state circuitry shown in FIG. 3. In the circuit shown in FIG. 3, the inverted mode transistor (half of Q6) which may be considered to act as a very low leakage diode, is reverse biased by way of the solid-state voltage divider composed of Q3 and Q5, the latter being connected and used as a low leakage Zener diode. This voltage divider, which affords virtually zero-power consumption (when the sensor system is inactive) provides a reverse bias potential of approximately 4V for the current switch Q6, thereby insuring the high impedance presented to the ion chamber or signal source. Thus, the input current, $Iin$, from the miniature ion chamber charges up capacitor $Ci$ as shown in the earlier and above embodiment. When the input voltage, $Vi$, reaches the discriminator threshold voltage, regenerative action takes place by capacitor $Cf$, as previously described. However, in this embodiment, as Q2 is turned on and a positive signal appears across resistor RL2, the MOSFET Q3 also turns on, lowering the potential at the low impedance side of current switch Q6 to near zero. Thus Q6 will be forward biased and conducting, thereby discharging the input capacitance, $Ci$, through resistor $Rf$. The biasing arrangement for Q6 by means of the Q3/Q5 divider assures a safe reverse bias for the Q6 device, will below its reverse breakdown voltage. The advantages of the embodiment of FIG. 3, over the reed-relay version (shown above) are mainly solid-state reliability, ability to respond to higher frequency, absence of audible noise, lower power consumption when activated and easy conversion to an optical sensing system.

The use of a MOSFET discriminator recycling circuit with either the reed-relay or solid-state version when coupled to a miniature ion chamber, both operating on a common battery, provides a simple and effective approach for a compact radiation sensor which is battery powered. Power consumption in the stand-by mode with no radiation incident is essentiallly zero. The circuit may also be adaptable for use with other electromagnetic energy spectrum detection by suitable modifications. For example, with a suitable connection of a photo-diode circuit, the device can become useful for light detection at minimum quiescent power dissipation, acting as a light sensitive pulsing source.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A radiation activated sensor for providing an output pulse when a predetermined amount of radiation has been detected comprising:

a capacitor;

a normally open high impedance switch;

an ionization chamber means connected to said capacitor for detecting electromagnetic radiation and for supplying a charge to said capacitor as a function of the amount of said electromagnetic radiation detected;

a MOSFET discriminator means connected to said capacitor and being biased to an off state when the charge on said capacitor is below a predetermined threshold value and being biased to an on state when the charge on said capacitor is above a predetermined threshold value;

a switch driving means connected to said MOSFET discriminator means and said high impedance switch for providing an output pulse and for closing said high impedance switch when said MOSFET discriminator means is biased from said off state to said on state; and said high impedance switch connected to said capacitor and including means for discharging said capacitor therethrough when closed by said switch driving means.

2. A radiation activated sensor as in claim 1 wherein said high impedance switch includes a magnetic reed relay and said switch driving means includes a coil means for operating said reed relay.

* * * * *